(12) United States Patent
Cai et al.

(10) Patent No.: US 8,810,893 B2
(45) Date of Patent: Aug. 19, 2014

(54) LOW VOLTAGE ELECTROWETTING DEVICE AND METHOD FOR MAKING SAME

(71) Applicant: The University of Kentucky Research Foundation, Lexington, KY (US)

(72) Inventors: Yuguang Cai, Lexington, KY (US); Xiaoning Zhang, Lexington, KY (US)

(73) Assignee: The University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 13/741,458

(22) Filed: Jan. 15, 2013

(65) Prior Publication Data

US 2014/0198372 A1 Jul. 17, 2014

(51) Int. Cl.
*G02B 26/00* (2006.01)
(52) U.S. Cl.
CPC .................................. *G02B 26/005* (2013.01)
USPC ........................................................ 359/290
(58) Field of Classification Search
CPC ............... B01F 5/0085; B01F 13/0071; B01F 13/0076; B01L 3/502792; G02B 26/004; G02B 26/005; H01G 9/025; H01G 9/15; H01G 11/56; H01G 11/48; C07C 217/08; C07C 309/15; C07C 309/21; C08F 220/60; C08F 2/02
USPC ................. 204/547, 450, 600, 643; 359/290; 361/523, 528; 427/256; 562/114
See application file for complete search history.

(56) References Cited

U.S. PATENT DOCUMENTS

| | | | |
|---|---|---|---|
| 7,117,807 B2 | 10/2006 | Bohn, Jr. et al. | |
| 7,147,763 B2 | 12/2006 | Elrod et al. | |
| 7,341,801 B2 | 3/2008 | Reuter et al. | |
| 7,807,852 B2 | 10/2010 | Ricks-Laskoski et al. | |
| 7,909,974 B2 | 3/2011 | Bartels et al. | |
| 8,134,024 B2 | 3/2012 | Ricks-Laskoski et al. | |
| 2008/0283414 A1 | 11/2008 | Monroe et al. | |
| 2009/0215192 A1 | 8/2009 | Stolowitz et al. | |
| 2009/0231670 A1 | 9/2009 | Bower et al. | |
| 2010/0173134 A1 | 7/2010 | Khokhlov et al. | |
| 2011/0019339 A1 | 1/2011 | Merker et al. | |
| 2012/0015146 A1 | 1/2012 | Advincula et al. | |
| 2012/0134073 A1 | 5/2012 | Uher et al. | |

FOREIGN PATENT DOCUMENTS

| | | |
|---|---|---|
| FR | 2884243 A1 | 10/2006 |
| JP | 2008107826 A | 5/2008 |

*Primary Examiner* — David N Spector
(74) *Attorney, Agent, or Firm* — King & Schickli, PLLC

(57) ABSTRACT

An electrowetting device includes a substrate having a first face, a charged adhesion layer immobilized on the first face of the substrate and a dielectric layer bound to the charged adhesion layer. An unbound ionic liquid phase contacts the dielectric layer.

20 Claims, 2 Drawing Sheets

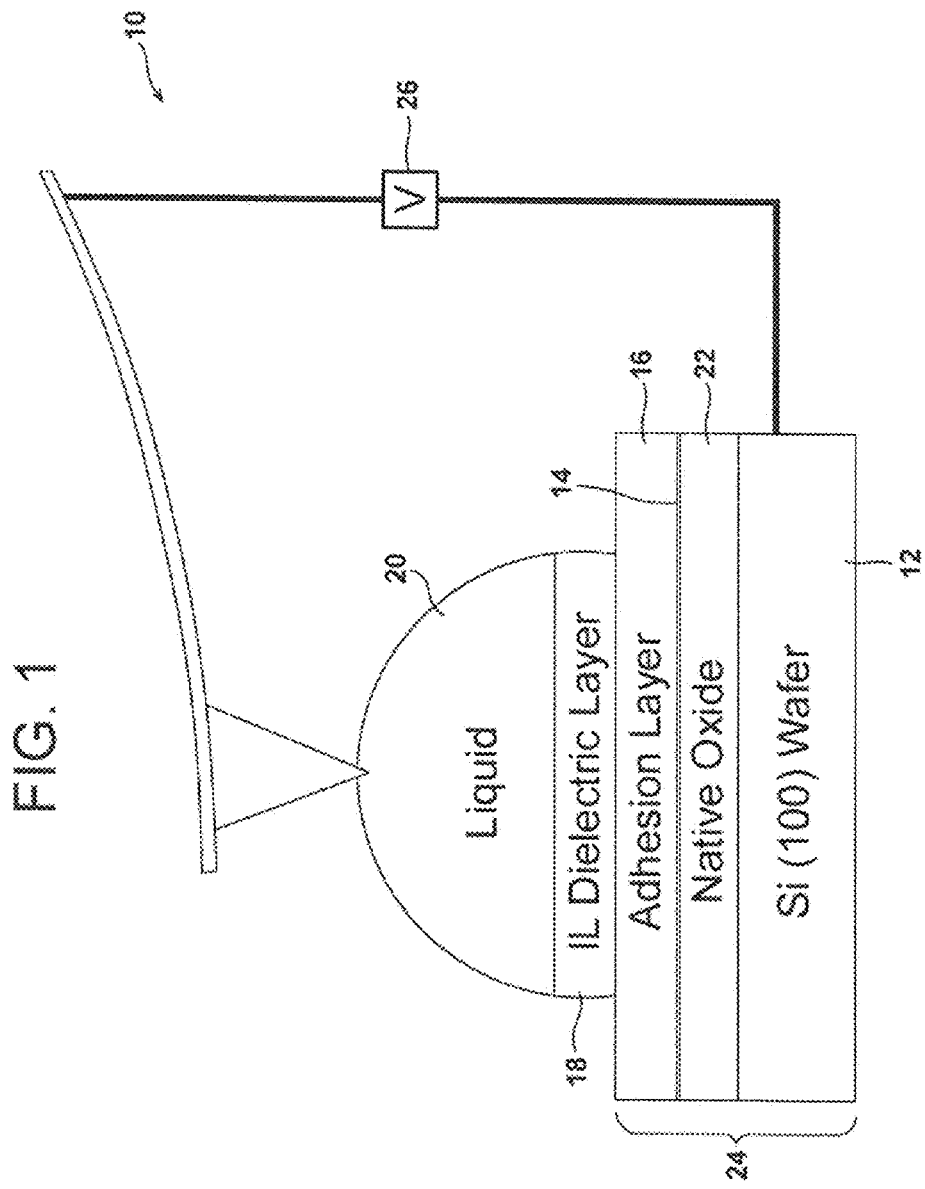

LOW VOLTAGE ELECTROWETTING DEVICE AND METHOD FOR MAKING SAME

TECHNICAL FIELD

The present invention relates generally to the field of electrowetting and, more particularly, to a low voltage electrowetting device and a method of making the same.

BACKGROUND

Electrowetting can be described by the Lippmann equation:

$$\gamma_{SL} = \gamma_{SL}^0 - \frac{1}{2}CV^2 \qquad (1)$$

where $\gamma_{SL}^0$ is the voltage-free solid-liquid interface energy, C is the capacitance between the drop and surface, and V is the voltage applied. In the case of electrowetting on dielectrics (EWOD), the capacitance C can be expressed by:

$$C = \frac{\varepsilon_0 \varepsilon_r A}{d}, \qquad (2)$$

where $\varepsilon_0$ is the permittivity in vacuum, $\varepsilon_r$ is the dielectric constant, A is the drop's contact area and d is the thickness of the dielectric layer. Since the contact angle can be expressed according to Young equation:

$$\cos\theta = \frac{\gamma_S - \gamma_{SL}}{\gamma_L}, \qquad (3)$$

Combining equation (1)-(3), we get:

$$\theta = \arccos\left(\frac{\gamma_S - \gamma_{SL}^0 + \frac{\varepsilon_0 \varepsilon_r A}{2d}V^2}{\gamma_L}\right). \qquad (4)$$

Eq. (4) suggests that there are two parallel approaches to reduce the driving voltage. One way is to increase the capacitance, either by decreasing the dielectric layer thickness or employing a coating with high dielectric constant; the other way is to minimize the interfacial energies of the solid ($\gamma_S - \gamma_{SL}^0$) and the liquid ($\gamma_L$), usually through using an immiscible oil bath. The first approach can reduce the driving voltage down to ~15V by employing a thin fluoropolymer coating. If combined with the oil bath approach, electrowetting can be achieved at less than 3V, at the price of incompatibility with digital micro-fluidics applications.

This document describes a low voltage electrowetting device incorporating an ionic liquid dielectric layer of ultra-high capacitance. Such a device is capable of electrowetting effects using driving voltages of just 70 mV and 5 V in AC and DC modes of operation. Further, such a device is compatible with digital micro-fluidics applications.

SUMMARY

In accordance with the purposes, benefits and advantages described herein a low voltage electrowetting device is provided. The electrowetting device comprises a substrate having a first face, a charged adhesion layer immobilized on the first face of the substrate and a dielectric layer bound to the charged adhesion layer. The dielectric layer comprises a first ionic liquid having a thickness of between about 2 and about 50 nm.

The device further includes an unbound ionic liquid phase contacting the dielectric layer. In one possible embodiment the ionic liquid utilized to form the dielectric layer differs from the unbound ionic liquid phase utilized to contact the dielectric layer. In another possible embodiment the ionic liquid utilized to form the dielectric layer is identical to the unbound ionic liquid phase contacting the dielectric layer. The electrowetting device provides electrowetting effects using a driving voltage of as little as 70 mV in AC mode and 5 V in DC mode. This performance is achieved in the absence of a flouropolymer layer and/or an oil bath.

In accordance with an additional aspect a method is provided for producing a low voltage electrowetting device. That method comprises applying an adhesion layer to a surface of a substrate, providing a charge to that adhesion layer and binding an ionic liquid to the charged adhesion layer so as to form a dielectric layer. More specifically, the applying step includes hydroxylating a surface of the substrate and then coating the hydroxylated surface with an adhesion agent. Further the method includes converting the adhesion layer to create a negatively charged layer for binding the ionic liquid. In addition the method further includes contacting the dielectric layer with an unbound ionic liquid phase. In one embodiment the unbound ionic liquid phase is a different ionic liquid from that utilized to form the dielectric layer. In another possible embodiment the unbound ionic liquid phase is formed from the same ionic liquid utilized to form the dielectric layer. In this latter embodiment the method further includes repairing defects developing in the dielectric layer with a portion of the ionic liquid from the unbound ionic liquid phase during operation of the device so as to avoid failure of the device from said defects.

BRIEF DESCRIPTION OF THE DRAWINGS

The accompanying drawings incorporated herein and forming a part of the specification, illustrate several aspects of the present electrowetting device and together with the description serve to explain certain principles of the device. In the drawings:

FIG. 1 is a schematical illustration of a novel low voltage electrowetting device;

Figures 2A, 2B:
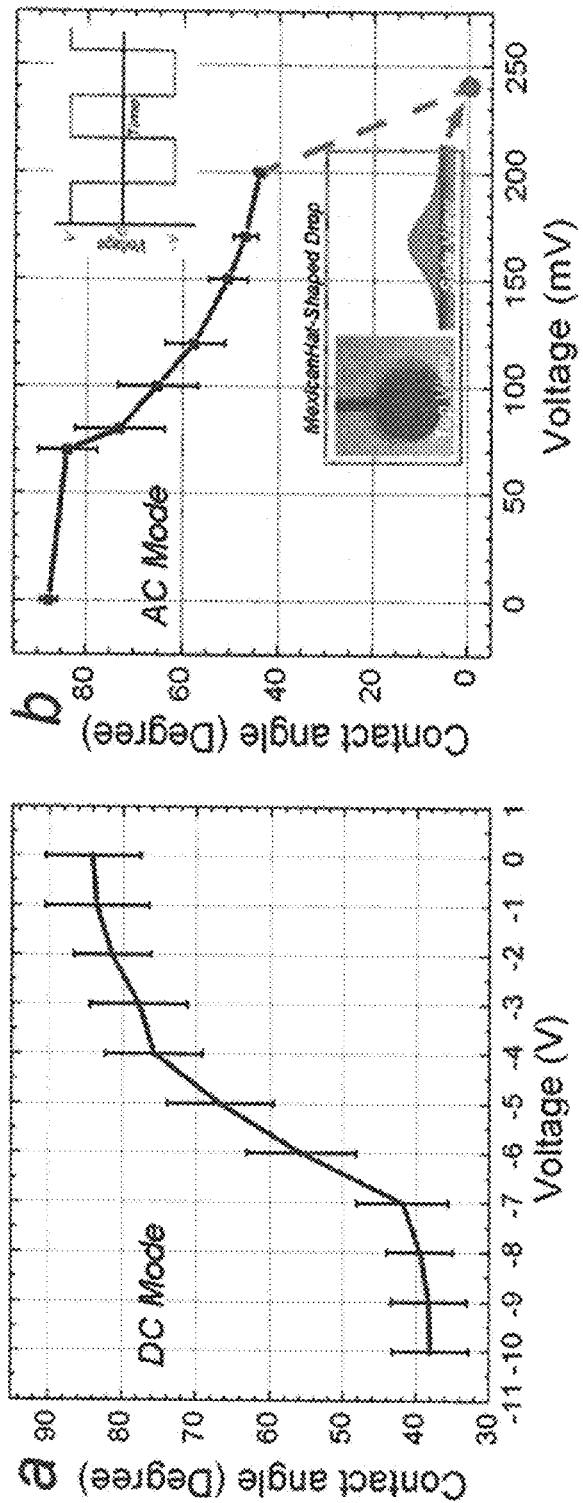
FIG. 2a is a graphical illustration of the contact angle as a function of voltage for 1-butyl-3-methylimidazolium chloride drops on an adhesion layer of octadecyltrichlorosilane under DC mode.
FIG. 2b is a graphical illustration of the contact angle as a function of voltage for 1-butyl-3-methylimidazolium chloride drops on an adhesion layer of octadecyltrichlorosilane under AC mode.

Reference will now be made in detail to the present preferred embodiments of the low voltage electrowetting device, an example of which is illustrated in the accompanying drawings.

DETAILED DESCRIPTION

Reference is now made to FIG. 1 schematically illustrating the low voltage electrowetting device 10. The electrowetting device 10 comprises a substrate 12 having a first surface 14. A charged adhesion layer 16 is immobilized on the first surface or face 14 and a dielectric layer 18 is bound to that charged adhesion layer. An ionic liquid phase 20 is provided in contact with the dielectric layer 18.

The substrate 12 may be made from any appropriate material including but not limited to silicon, indium tin oxide (ITO) glass, metal, gold, silver, steel, copper and mixtures thereof.

The adhesion layer includes a material selected from a group consisting of silane, octadecyltrichlorosilane (OTS), 9-undecenyltrichorosilane, alkyl($C_nH_{2n+1}$)trichlorosilane, alkyl($C_nH_{2n+1}$)dichlorosilane, alkyl($C_nH_{2n+1}$)trimethoxysilane, alkyl($C_nH_{2n+1}$)dimethoxysilane, alkyl($C_nH_{2n+1}$)thiol for metal surface, where n=8 to 22 and mixtures thereof.

Where the substrate 12 is made from silicon, the surface 14 comprises a native oxide coating 22. The surface 14 is hydroxylated and then coated with the adhesion agent that forms the adhesion layer 16 so that the adhesion layer is immobilized on the face 14 of the substrate 12.

The adhesion layer 16 is then converted to provide the adhesion layer with a negative charge that will subsequently bind the ionic liquid forming the dielectric layer 18. This conversion may be completed in any appropriate manner including exposing the adhesion layer 16 to an oxidizing agent such as a solution of sodium periodate and magnesium permanganate for an appropriate time and at an appropriate temperature (e.g., for 12 hours at 40° C.). This forms carboxylic acid functional groups over the adhesion layer 16. Accordingly, when the ionic liquid contacts the negatively charged adhesion layer the ionic liquid immediately forms a dielectric layer having a thickness of between about 2 and about 50 nm with solid-like properties.

It should be appreciated that the native oxide layer 22 forming the surface 14 and the adhesion layer 16 are both porous and act neither as a dielectric layer nor an insulator. Accordingly, the substrate 12, native oxide layer 22 and adhesion layer 16 effectively form a first electrode 24. A voltage source 26 applies a voltage across the first electrode 24 and the ionic liquid phase 20 that functions as a second electrode in order to effect electrowetting.

It should be appreciated that the ionic liquid utilized to form the dielectric layer 18 may be selected from a group of materials consisting of an imidazolium salt, 1-butyl-3methylimidazolium halide, 1-butyl-3-methyl-imidazolium bis(trifluoromethylsulfonyl)imide, 1-decyl-3-methyl-imidazolium halide, 1-alkyl (1)-3alkyl(2)imidazoliumhalide alkyl(1): $C_nH_{2n+1}$, n=2-12; alkyl(2): $C_nH_{2n+1}$, n=2-12 and mixtures thereof. The unbound liquid phase may be selected from substantially any known unbound ionic liquid. This includes but is not limited to water, salt water, imidazolium salt, 1-butyl-3methylimidazolium halide, 1-butyl-3-methyl-imidazolium bis(trifluoromethylsulfonyl)imide, 1-decyl-3-methyl-imidazolium halide, 1-alkyl (1)-3alkyl(2)imidazoliumhalide alkyl(1): $C_nH_{2n+1}$, n=2-12; alkyl(2): $C_nH_{2n+1}$, n=2-12. In one possible embodiment the ionic liquid used to form the dielectric layer 18 is different from the ionic liquid used to form the unbound ionic liquid phase 20. In this situation it is only important that the ionic liquid in the liquid phase not react with, dissolve or otherwise disrupt the dielectric layer 18. In an alternative embodiment the ionic liquid utilized to form the dielectric layer 18 and the ionic liquid utilized to form the unbound ionic liquid phase 20 are the same ionic liquid.

Defects in a dielectric layer are often responsible for the failure of electrowetting on dielectric devices because small ions may diffuse into these defects. When the ionic liquid utilized to form the unbound ionic liquid phase 20 is the same as the ionic liquid utilized to previously form the dielectric layer 18 such dielectric layer breakdown is avoided because the liquid phase ionic liquid on top of the dielectric layer replenishes the defects and hot spots inside the dielectric layer virtually immediately restoring the integrity of the dielectric layer.

Advantageously, the device 10 provides electrowetting effects using a driving voltage of as little as 70 mV in AC mode of operation and as little as 5 V in DC mode of operation. This allows electrowetting to be driven directly by digitally integrated circuit chips or computer output ports without voltage escalation circuitry thereby representing a significant advance in the art. Thus, this new technology has great potential to simplify digital micro-fluidic design. Further it should be appreciated that these numbers are achieved in the absence of a flouropolymer layer and/or an oil bath. Thus it should be appreciated that liquid drops on the surface of the low voltage electrowetting device 10 may be manipulated without an oil bath thereby potentially allowing the production of oil bath-free liquid lens and e-ink displays.

The low-voltage electrowetting device may be produced by a method broadly described as comprising the steps of applying an adhesion layer to a substrate, providing a charge to the adhesion layer and binding an ionic liquid to the charged adhesion layer so as to form a dielectric layer. That applying step includes hydroxylating a surface of the substrate and then coating the hydroxylated surface with an adhesion agent to form the adhesion layer. In one particularly useful embodiment the adhesion agent is selected from a group consisting of a silane, a vinyl terminated silane, an ester (RCOO—) terminated silane and mixtures thereof. The silane's terminal group may be oxidized or hydrolyzed into a negatively charged functional group. In one such embodiment the method includes oxidizing an adhesion layer to create a negatively charged layer for biding the ionic liquid. This is followed by contacting the dielectric layer with an unbound ionic liquid phase. In one particularly useful embodiment the ionic liquid used to form the dielectric layer 18 and the ionic liquid used to form the ionic liquid phase 20 is the same ionic liquid. This allows for the repairing of defects developing in the dielectric layer 18 with a portion of the ionic liquid from the unbound ionic liquid phase 20 during operation of the device so as to avoid failure from those defects.

The following examples are presented to further illustrate how to make and utilize the electrowetting device 10, but it is not to be considered as limited thereto.

Example 1

A flat and conducting substrate made from indium tin oxide, silicon, gold coating mica or the like is cleaned in piranha solution for 20 minutes. After rinsing in distilled water three times the substrate is dried in a stream of pure nitrogen. The substrate is then incubated in 5 mM 9-undecenyltrichlorosilane (UTS) toluene solution overnight.

The substrate is then rinsed in toluene three times. Next the sample is incubated in 100% relative humidity air at 40° C. for eight hours. The substrate is then incubated in UTS solution for eight hours. Such a UTS-incubation-toluene rinsing-humid air incubation cycle is repeated three times.

After rinsing in distilled water, the substrate is incubated in a solution made of sodium periodate and magnesium permanganate for twelve hours at 40° C. The substrate surface oxidizes into carboxylic acid terminated functional units.

After rinsing in distilled water, the substrate is dip-coated/span-coated using a 0.5% (ww) ionic liquid of 1-butyl-3- methylimidazolium chloride, butanol solution. After coating, a dielectric layer of 2-50 nm in thickness forms on the substrate.

Example 2

A flat and conducting substrate made from indium tin oxide, silicon, gold coating mica or the like is cleaned in piranha solution for 20 minutes. After rinsing in distilled water three times the substrate is dried in a stream of pure nitrogen. The substrate is then incubated in 5 mM 9-undecenyltrichlorosilane (UTS) toluene solution overnight.

The substrate is then rinsed in toluene three times. Next the sample is incubated in 100% relative humidity air at 40° C. for eight hours. The substrate is then incubated in UTS solution for eight hours. Such a UTS-incubation-toluene rinsing-humid air incubation cycle is repeated three times.

After rinsing in distilled water, the substrate is incubated in a solution made of sodium periodate and magnesium permanganate for twelve hours at 40° C. The substrate surface oxidizes into carboxylic acid terminated functional units.

After rinsing in distilled water, the substrate is dip-coated/span-coated using a 0.5% (ww) ionic liquid of 1-butyl-3-methylimidazolium bis(trifluoromethylsulfonyl)imide, butanol solution. After coating, a dielectric layer of 2-50 nm in thickness forms on the substrate.

The bound dielectric layer of 1-butyl-3-methylimidazolium bis(trifluoromethylsulfonyl)imide was then contacted with an unbound ionic liquid phase of 1-butyl-3-methylimidazolium bis(trifluoromethylsulfonyl)imide. Alternatively, the bound dielectric layer of 1-butyl-3-methylimidazolium bis(trifluoromethylsulfonyl)imide may instead be contacted with an unbound ionic liquid phase of 1-butyl-3-methylimidazolium chloride.

Example 3

A flat and conducting substrate made from indium tin oxide, silicon, gold coating mica or the like is cleaned in piranha solution for 20 minutes. After rinsing in distilled water three times the substrate is dried in a stream of pure nitrogen. The substrate is then incubated in 5 mM 2-(carbomethoxy)ethyltrichloro silane (ACS #18163-42-3) toluene solution overnight.

The substrate is then rinsed in toluene three times. Next the sample is incubated in 100% relative humidity air at 40° C. for eight hours.

After rinsing in distilled water, the substrate is boiled in a 2M HCl for 40 min. The substrate surface is converted into carboxylic acid terminated functional units.

After rinsing in distilled water, the substrate is dip-coated/span-coated using a 0.5% (ww) ionic liquid of 1-butyl-3-methylimidazoliumbis(trifluoromethylsulfonyl)imide, butanol solution. After coating, a dielectric layer of 2-50 nm in thickness forms on the substrate.

The bound dielectric layer of 1-butyl-3-methylimidazoliumbis(trifluoromethylsulfonyl)imide was then contacted with an unbound ionic liquid phase of 1-butyl-3-methylimidazoliumbis(trifluoromethylsulfonyl)imide. Alternatively, the bound dielectric layer of 1-butyl-3-methylimidazoliumbis(trifluoromethylsulfonyl)imide may instead be contacted with an unbound ionic liquid phase of 1-butyl-3-methylimidazolium chloride.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An electrowetting device, comprising:
a substrate having a first face;
a charged adhesion layer immobilized on said first face of said substrate; and
a dielectric layer bound to said charged adhesion layer.

2. The device of claim 1, wherein said substrate is made from a material selected from a group consisting of silicon, ITO (indium tin oxide) glass, metal, gold, silver, steel, copper and mixtures thereof.

3. The device of claim 1, wherein said charged adhesion layer includes a material selected from a group consisting of silane, octadecyltrichlorosilane (OTS), octadecyltrichlorosilane (OTS), 9-undecenyltrichorosilane, alkyl($C_nH_{2n+1}$) trichlorosilane, alkyl($C_nH_{2n+1}$)dichlorosilane, alkyl($C_nH_{2n+1}$)trimethoxysilane, alkyl($C_nH_{2n+1}$)dimethoxysilane, alkyl($C_nH_{2n+1}$)thiol for metal surface, where n=8 to 22 and mixtures thereof.

4. The device of claim 1 wherein said dielectric layer comprises a first ionic liquid having a thickness of 2-50 nm.

5. The device of claim 4, wherein said first ionic liquid is selected from a group of materials consisting of an imidazolium salt such as 1-butyl-3-methylimidazolium halide, 1-butyl-3-methylimidazolium bis(trifluoromethylsulfonyl)imide, 1-decyl-3-methylimidazolium halide, and mixtures thereof.

6. The device of claim 4, further including an unbound ionic liquid phase contacting said dielectric layer.

7. The device of claim 6, wherein said ionic liquid utilized to form said unbound ionic liquid phase is different from said first ionic liquid.

8. The device of claim 6, wherein said ionic liquid utilized to form said unbound ionic liquid phase and said first ionic liquid are the same.

9. The device of claim 6, wherein said unbound ionic liquid phase is formed from an ionic liquid selected from a group of ionic liquids consisting of water, salt water, an imidazolium salt, 1-butyl-3-methylimidazolium halide, 1-butyl-3-methylimidazolium bis(trifluoromethylsulfonyl)imide, 1-decyl-3-methylimidazolium halide, and mixtures thereof.

10. The device of claim 6, wherein said device provides electrowetting effects using a driving voltage of as little as 70 mV in AC mode.

11. The device of claim 6, wherein said device provides electrowetting effects using a drive voltage of as little as 5V in DC mode.

12. The device of claim 11, wherein said electrowetting effects are achieved in absence of a fluoropolymer layer.

13. The device of claim 11, wherein said electrowetting effects are achieved in absence of an oil bath.

14. A method of producing a low-voltage electrowetting device, comprising:
applying an adhesion layer to a substrate;
providing a charge to said adhesion layer;
binding an ionic liquid to said charged adhesion layer so as to form a dielectric layer.

15. The method of claim 14 including converting said adhesion layer to create a negatively charged layer for binding with said ionic liquid.

16. The method of claim 14 wherein said applying step includes hydroxylating a surface of said substrate and then coating said hydroxylated surface with an adhesion agent.

17. The method of claim 16 including selecting said adhesion agent from a group consisting of a silane, a vinyl terminated silane, ester-terminated (ROOC—) and mixtures thereof.

18. The method of claim 14 further including contacting said dielectric layer with an unbound ionic liquid phase.

19. The method of claim 18, including using a single type of ionic liquid for both said dielectric layer and said unbound ionic liquid phase.

20. The method of claim 19, including repairing defects developing in said dielectric layer with a portion of said ionic liquid from said unbound ionic liquid phase during operation of said device so as to avoid failure from said defects.

\* \* \* \* \*